US008354915B2

United States Patent
Michel et al.

(10) Patent No.: US 8,354,915 B2
(45) Date of Patent: Jan. 15, 2013

(54) MULTI-CHANNEL PASSIVE ENTRY SYSTEM FOR VEHICLES

(75) Inventors: Ignacio Michel, Carol Stream, IL (US); Stefan Dziaba, Cortland, IL (US)

(73) Assignee: Omron Automotive Electronics, Inc., Saint Charles, IL (US)

( * ) Notice: Subject to any disclaimer, the term of this patent is extended or adjusted under 35 U.S.C. 154(b) by 815 days.

(21) Appl. No.: 12/389,970

(22) Filed: Feb. 20, 2009

(65) Prior Publication Data

US 2009/0212906 A1 Aug. 27, 2009

Related U.S. Application Data

(60) Provisional application No. 61/031,863, filed on Feb. 27, 2008.

(51) Int. Cl.
*G06K 19/00* (2006.01)
(52) U.S. Cl. .................. 340/5.72; 340/5.62; 340/426.36
(58) Field of Classification Search .................. 340/5.72, 340/5.8, 3.41, 4.62, 426.36, 426.13, 16, 17, 340/426.17, 426.16, 5.61
See application file for complete search history.

(56) References Cited

U.S. PATENT DOCUMENTS

| | | | | |
|---|---|---|---|---|
| 6,134,692 A * | 10/2000 | Sekiya et al. | .................. | 714/749 |
| 6,603,388 B1 * | 8/2003 | Perraud et al. | ................ | 340/5.61 |
| 7,206,367 B1 * | 4/2007 | Moore | .......................... | 375/354 |
| 7,667,571 B2 * | 2/2010 | Mueller et al. | ................ | 340/5.61 |
| 2007/0164104 A1 * | 7/2007 | Dulgerian et al. | ............ | 235/382 |

* cited by examiner

*Primary Examiner* — Edwin Holloway, III
(74) *Attorney, Agent, or Firm* — Foley & Lardner LLP

(57) ABSTRACT

A method and system for determining whether or not passive entry of a vehicle is permitted, includes allocating separate channels for each authorized key FOB for the vehicle. An indication of manual entry of the vehicle is detected. Upon such detection, a challenge from a transmitter of a passive entry system is output. The challenge is received by more than one key FOB in a vicinity of the vehicle, and outputting a respective remote keyless entry response at an assigned frequency channel for each respective key FOB. The remote keyless entry responses are received at a receiver of the passive entry system, at each respective channel allocated for the respective key FOBs. A determination is then made as to whether or not any of the respective key FOBs are assigned to authorized users of the vehicle, and if so, a vehicle door is set in an unlocked state to allow entry into the vehicle.

4 Claims, 4 Drawing Sheets

MULTI-CHANNEL PASSIVE ENTRY SYSTEM FOR VEHICLES

RELATED APPLICATIONS

This application claims priority to provisional patent application 61/031,863, entitled MULTI-CHANNEL PASSIVE ENTRY SYSTEM FOR VEHICLES, filed Feb. 27, 2008, which is incorporated in its entirety herein by reference.

FIELD OF THE INVENTION

This invention is directed to passive entry systems for vehicles, and in particular, this invention is directed to a multi-channel passive entry system for vehicles.

BACKGROUND OF THE INVENTION

Some vehicles employ passive entry systems, in which a controller provided in the vehicle periodically polls for key FOBs (hereinafter referred to as either FOBs or key FOBs) in the vicinity of the vehicle, and to allow entry into the vehicle (e.g., by unlocking a locked door) when an appropriate key FOB is detected. A vehicle passive entry system operates by sensing a door handle operation, such as when a person attempts to open a door. Upon such a sensing, the passive entry system then polls for any key FOBs in the vicinity of the vehicle, by outputting a low frequency (LF) signal, which corresponds to a FOB interrogation signal. The key FOBs in the vicinity of the vehicle respond to this interrogation signal by outputting an ID signal, which is received by a receiver of the passive entry system. When an ID of a key FOB assigned to an allowed vehicle operator is detected, the door upon which the door handle operation was sensed is opened from a locked state, thereby allowing passive vehicle entry.

A problem occurs in conventional vehicle passive entry systems when more than one FOB responds to the interrogation signal output by the passive entry system. This simultaneous response by more than one FOB results in data collision at the receiver of the passive entry system. Due to the collision of data, the passive entry system cannot properly decode the data, and it cannot determine whether or not the person attempting to open the vehicle door is an authorized person.

To solve the above problem, one conventional approach is to preprogram a delay for each FOB to respond to an interrogation signal, so that the likelihood of data collision is minimized. Thus, for a vehicle having two vehicle operators, each with their own FOB, the first vehicle operator's FOB is programmed to respond immediately to a passive entry system interrogation signal, whereby the second vehicle operator's FOB is programmed to respond after a preprogrammed delay, e.g., 10 millisecond delay. The preprogrammed delay allows for enough time such that there is no possibility of data collision of data output by the second vehicle operator's FOB with respect to data recently output by the first vehicle operator's FOB. However, such a system suffers in that the response time for opening a vehicle door is necessarily increased due to the preprogrammed delays built into to each FOB, whereby such a delay may be fairly large when a number of allowable FOBs (e.g., 50 or more) are assigned to authorized vehicle operators.

SUMMARY OF THE INVENTION

The present invention relates to a passive entry system and method for vehicles.

In accordance with one aspect of the invention, there is provided a method for determining whether or not passive entry of a vehicle is permitted. The method includes a step of allocating separate channels for each authorized key FOB for the vehicle. The method includes a step of detecting an indication of manual entry of the vehicle. The method further includes a step of, in response to the detecting of the indication of manual entry into the vehicle, outputting a challenge from a transmitter of a passive entry system provided in the vehicle. The method also includes a step of receiving the challenge by more than one key FOB in a vicinity of the vehicle, and outputting a respective remote keyless entry response at an assigned frequency channel for each respective key FOB. The method further includes a step of receiving the remote keyless entry responses at a receiver of the passive entry system, at each respective channel allocated for the respective key FOBs. The passive entry system then determines whether or not any of the respective key FOBs are assigned to authorized users of the vehicle, and if so, a vehicle door is placed in an unlocked state to allow entry into the vehicle.

In accordance with another aspect of the invention, there is provided a passive entry system for a vehicle. The system includes a passive entry detector configured to detect manual entry into the vehicle. The system further includes a transmitter configured to output a challenge based on detection of the manual entry. The system also includes a controller configured to allocate channels to each authorized key FOB. The system still further includes a receiver configured to receive one or more remote keyless entry responses at each respective channel allocated for the authorized key FOBs. The controller determines, based on the received one or more remote keyless entry responses, whether any of the remote keyless entry responses are from authorized key FOBs, and if so, a vehicle door of the vehicle is placed in an unlocked state to allow keyless entry into the vehicle.

In accordance with yet another aspect of the invention, there is provided a computer readable medium embodying computer program product for determining whether or not passive entry of a vehicle is permitted. The computer program product, when executed by a computer, causing the computer to perform the steps of:

allocating separate channels for each authorized key FOB for the vehicle;

detecting an indication of manual entry into the vehicle;

in response to the detecting of the indication of manual entry of the vehicle, outputting a challenge from a transmitter of a passive entry system provided in the vehicle;

receiving the challenge by more than one key FOB in a vicinity of the vehicle, and outputting a respective remote keyless entry response at an assigned frequency channel for each respective key FOB;

receiving the remote keyless entry responses at a receiver of the passive entry system, at each respective channel allocated for the respective key FOBs; and determining whether or not any of the respective key FOBs are assigned to authorized users of the vehicle, and if so, a vehicle door is placed in an unlocked state to allow entry into the vehicle.

BRIEF DESCRIPTION OF THE DRAWINGS

The accompanying drawings, which are incorporated in and constitute a part of this specification, illustrate several embodiments of the invention and, together with the description, serve to explain the principles of the invention.

DETAILED DESCRIPTION

Reference will now be made in detail to embodiments of the invention, examples of which are illustrated in the accompanying drawings. An effort has been made to use the same reference numbers throughout the drawings to refer to the same or like parts.

Unless explicitly stated otherwise, "and" can mean "or," and "or" can mean "and." For example, if a feature is described as having A, B, or C, the feature can have A, B, and C, or any combination of A, B, and C. Similarly, if a feature is described as having A, B, and C, the feature can have only one or two of A, B, or C.

Unless explicitly stated otherwise, "a" and "an" can mean "one or more than one." For example, if a device is described as having a feature X, the device may have one or more of feature X.

A first embodiment of the invention is directed to a multi-channel passive entry system for a vehicle, which allows two or more key FOBs to respond to an interrogation signal made by the passive entry system without causing collision of the received data from the two or more key FOBs at a receiver of the passive entry system.

Figure 1:
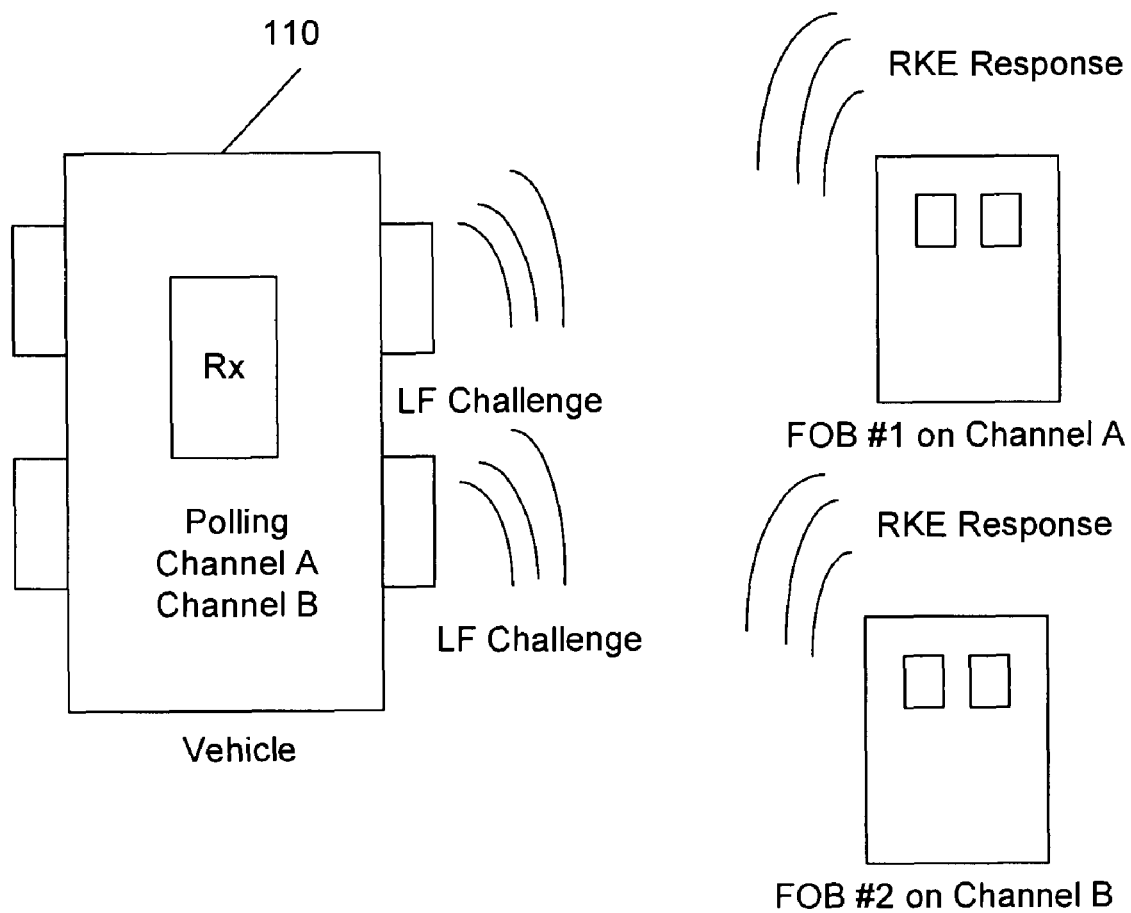
FIG. 1 is a block diagram showing components used in a multi-channel passive entry system according to a first embodiment of the invention.

In the first embodiment, with reference to FIG. 1, a first key FOB (FOB #1) is assigned a first predetermined frequency channel, Channel A, for outputting a Remote Keyless Entry response (RKE response), for responding to a passive entry interrogation signal. A second key FOB (FOB #2) is assigned a second predetermined frequency channel, Channel B, for outputting an RKE response, for responding to the passive entry interrogation signal, whereby Channel A and Channel B are non-overlapping channels.

Current passive entry systems use frequency bands in either a 315 MHz frequency range or a 433 MHz frequency range. In one possible implementation of the first embodiment, Channel A is assigned to a frequency channel of 315.000 MHz to 315.150 MHz, Channel B is assigned to a frequency channel of 315.150 MHz to 315.300 MHz, and Channel C (for key FOB #3) is assigned to a frequency channel of 315.300 MHz to 315.450 MHz, etc., whereby the assigned channels are adjacent to each other and whereby each channel has the same bandwidth. Of course, one of ordinary skill in the art will recognize that a frequency band of any appropriate size and at any appropriate frequency range (e.g., kHz range, MHz range, GHz range) can be assigned to the different channels of the different FOBs, with the only proviso being that the channels are non-overlapping with respect to each other.

In the first embodiment, when a manual vehicle door opening operation is detected on a vehicle door, a receiver Rx of a passive entry system 110 provided within the vehicle outputs a low frequency (LF) challenge. In response to the challenge, key FOBs within a vicinity of the passive entry system output their respective RKE responses, whereby authorized key FOBs FOB #1, FOB #2 output their respective RKE responses on preassigned frequency bands (or channels). In the first embodiment, the receiver Rx scans through the preassigned frequency bands to detect if one or more authorized key FOBs are in the vicinity of the vehicle. If so, the vehicle door that has been manually attempted to be opened, is opened automatically by the passive entry system, to thereby allow the authorized vehicle operator to enter the vehicle without having to fumble with his/her key to manually open the vehicle door.

Figure 2:
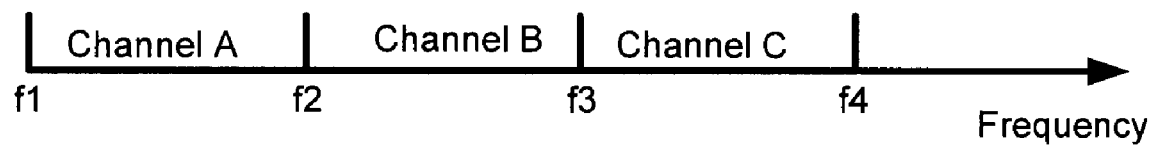
FIG. 2 is a frequency plot of channel allocation according to the first embodiment.
Figure 3:
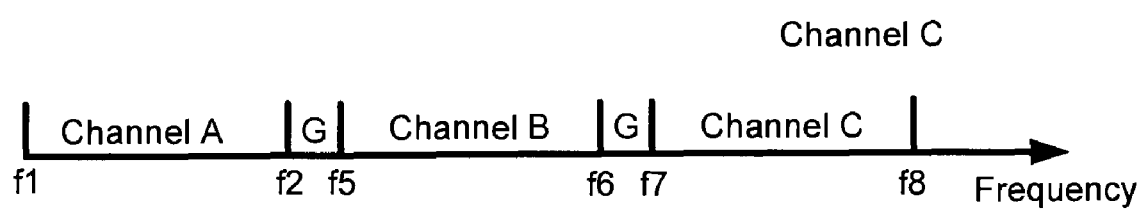
FIG. 3 is a frequency plot of channel allocation according to a second embodiment.

FIG. 2 shows a frequency spectrum according to the first embodiment in which three separate channels, Channel A, Channel B, and Channel C, have been preassigned to three authorized key FOBs, FOB #1, FOB #2, and FOB #3. Channel A is assigned a frequency band between f1 and f2, Channel B is assigned a frequency band between f2 and f3, and Channel C is assigned a frequency band between f3 and f4. While FIG. 2 shows the three channels as being consecutively positioned with respect to each other, in a second embodiment, as shown in FIG. 3, the channels are separated from each other by a guard band G. The assigned guard band G, which is 10 kHz in one possible implementation, can be of any appropriate size (e.g., 5 to 50 kHz), as is known to those skilled in the art. In FIG. 3, Channel A is assigned a frequency band between f1 and f2, Channel B is assigned a frequency band between f5 and f6, and Channel C is assigned a frequency band between f7 and f8, whereby a guard band G (f2 to f3) between Channel A and Channel B, and a guard band G (f6 to f7) between Channel B and Channel C are provided to lessen the possibility of any channel interference.

Thus, according to the present invention, when two or more authorized vehicle operators approach a vehicle at the same time (with their respective key FOBs provided somewhere on their person), and whereby at least one of those authorized vehicle operators manually attempts to open a vehicle door to thereby start the passive entry system, the passive entry system receives RKE responses on separate channels, such that no possible of data collision due to simultaneous reception of the RKE responses at the receiver Rx of the passive entry system will occur. Also, as compared to the conventional system which assigns a different predetermined delay to different FOBs, the response time to the received RKE responses is shortened.

In a third embodiment, the scanning of the receiver Rx of the passive entry system is programmed such that it starts scanning at a frequency band (or channel) of the most-used key FOB, and then it scans to a frequency band (or channel) of the second-most-used key FOB, . . . , all the way to ending its scan at a frequency band (or channel) of the least-used key FOB. In the third embodiment, a history table is provided in a memory (e.g., RAM) of the passive entry system, whereby the history table stores values corresponding to all attempts to enter the vehicle, either manually or by operation of a button on a key FOB, for each of the authorized key FOBs. The time values associated with each attempt to enter the vehicle can also be stored in the history table.

In one example, assume that key FOB #1 assigned to authorized vehicle operator #1 has attempted to enter into the vehicle 25 times over the past one month, key FOB #2 assigned to authorized vehicle operator #2 has attempted to enter into the vehicle 13 times over the past one month, and key FOB #3 assigned to authorized vehicle operator #3 has attempted to enter into the vehicle 35 times over the past one month. According to the third embodiment, the receiver Rx of the passive entry system, upon detection of a manual vehicle door opening operation (e.g., movement of a door handle on a vehicle door), will output an LF challenge. The receiver Rx will then start its reception operation to scan the frequency band assigned to key FOB #3 (e.g., 315.300 to 315.450 MHz)

to check for key FOB #3 in the vicinity of the vehicle, then the receiver will then scan the frequency band assigned to key FOB #1 (e.g., 315.000 to 315.150 MHz), and then the receiver will then scan the frequency band assigned to key FOB #2 (e.g., 315.150 to 315.300 MHz).

Figure 4:
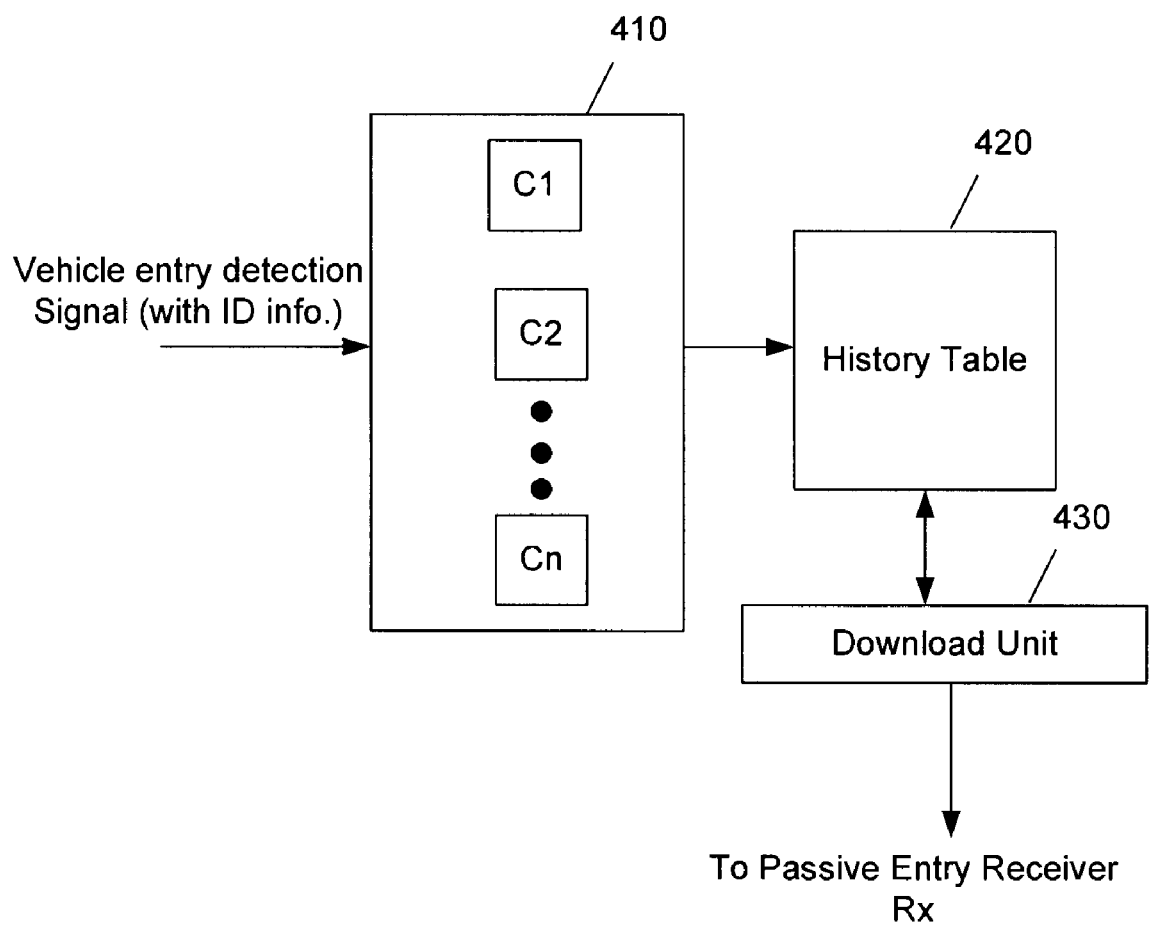
FIG. 4 is a block diagram showing elements making up a multi-channel passive entry system according to a first embodiment of the invention.

In the third embodiment, appropriate logic is provided in the passive entry system to allow for changes in the order of the scanned frequency bands, based on the latest information stored in the history table. FIG. 4 shows one possible implementation of such appropriate logic, whereby each manual vehicle entry operation and each automatic vehicle entry operation is detected, which results in a counter unit 410 having a counter (one of the counters C1, C2, . . . , Cn) assigned to the vehicle operator who has attempted either manual or keyless entry into the vehicle being incremented by one. This results in an updating of a memory location in a history table 420 assigned to that respective authorized vehicle operator. Based on the latest information stored in the history table, a download of the history table 420 is made periodically by a download unit 430, such as every week or every month, to determine the authorized vehicle operators having the greatest to the least number of attempted door openings of the vehicle. The scanning order of the receiver Rx of the passive entry system is set based on the respective frequency channels assigned to vehicle operators having the greatest, the next greatest, . . . , and lastly to the least number of attempted door openings for the vehicle that have been sensed over a predetermined time period (e.g., the last one month, the last 6 months, etc.).

For a purely manual vehicle entry (e.g., key placed into lock on vehicle door) made by a vehicle operator, that entry can be assigned to an appropriate vehicle operator based on an ID signal output by a key attached to the vehicle operator's key FOB, when the key is inserted into an ignition switch of the vehicle. The detection of that ID signal will result in incrementing the associated counter Ci assigned to the vehicle operator within the counter unit 410, which will then cause an increment of a corresponding memory location within the history table 420.

The embodiments described above have been set forth herein for the purpose of illustration. This description, however, should not be deemed to be a limitation on the scope of the invention. Various modifications, adaptations, and alternatives may occur to one skilled in the art without departing from the claimed inventive concept. The spirit and scope of the invention are indicated by the following claims.

What is claimed is:

1. A method for determining whether or not passive entry of a vehicle is permitted, comprising:
    allocating separate channels for each authorized key FOB for the vehicle;
    detecting an indication of manual entry of the vehicle;
    outputting, in response to the detecting of the indication of manual entry into the vehicle, a challenge from a transmitter of a passive entry system provided in the vehicle;
    receiving the challenge by more than one key FOB in a vicinity of the vehicle, and outputting a respective remote keyless entry response at an assigned frequency channel for each respective key FOB;
    receiving the remote keyless entry responses at a receiver of the passive entry system, at each respective channel allocated for the respective key FOBs; and
    determining whether or not any of the respective key FOBs are assigned to authorized users of the vehicle, and if so, setting a vehicle door in an unlocked state to allow entry into the vehicle,
    wherein the receiving the remote keyless entry responses at a receiver step comprises:
    setting a scan frequency of the receiver to a first channel assigned to a first authorized key FOB that corresponds to a first authorized key FOB that has most accesses to the vehicle over a predetermined time period in the past; and
    thereafter, setting the scan frequency of the receiver to a second channel assigned to a second authorized key FOB that corresponds to a second authorized key FOB that has the second-most accesses to the vehicle over the predetermined time period in the past.

2. A passive entry system for a vehicle, comprising:
    a passive entry detector configured to detect manual entry into the vehicle;
    a transmitter configured to output a challenge based on detection of the manual entry;
    a controller configured to allocate channels to each authorized key FOB;
    a receiver configured to receive one or more remote keyless entry responses at each respective channel allocated for the authorized key FOBs,
    wherein the controller determines, based on the received one or more remote keyless entry responses, whether any of the remote keyless entry responses are from authorized key FOBs, and if so, a vehicle door of the vehicle is placed in an unlocked state to allow keyless entry into the vehicle,
    wherein the receiver comprises a scan setter that is configured to set a scan frequency of the receiver to a first channel assigned to a first authorized key FOB that corresponds to a first authorized key FOB that has most accesses to the vehicle over a predetermined time period in the past, and, thereafter, to set the scan frequency of the receiver to a second channel assigned to a second authorized key FOB that corresponds to a second authorized key FOB that has the second-most accesses to the vehicle over the predetermined time period in the past.

3. The system according to claim 2, further comprising a history table configured to store a history of manual and keyless entries made to the vehicle by each of the authorized users of the vehicle over the predetermined time period in the past.

4. A non-transitory computer readable medium embodying computer program product for determining whether or not passive entry of a vehicle is permitted, the computer program product, when executed by a computer, causing the computer to perform the steps of:
    allocating separate channels for each authorized key FOB for the vehicle;
    detecting an indication of manual entry of the vehicle;
    outputting, in response to the detecting of the indication of manual entry into the vehicle, a challenge from a transmitter of a passive entry system provided in the vehicle;
    receiving the challenge by more than one key FOB in a vicinity of the vehicle, and outputting a respective remote keyless entry response at an assigned frequency channel for each respective key FOB;
    receiving the remote keyless entry responses at a receiver of the passive entry system, at each respective channel allocated for the respective key FOBs; and
    determining whether or not any of the respective key FOBs are assigned to authorized users of the vehicle, and if so, setting a vehicle door in an unlocked state to allow entry into the vehicle, wherein the receiving the remote keyless entry responses at a receiver step comprises:

setting a scan frequency of the receiver to a first channel assigned to a first authorized key FOB that corresponds to a first authorized key FOB that has most accesses to the vehicle over a predetermined time period in the past; and thereafter, setting the scan frequency of the receiver to a second channel assigned to a second authorized key FOB that corresponds to a second authorized key FOB that has the second-most accesses to the vehicle over the predetermined time period in the past.

* * * * *